(12) United States Patent
Huang et al.

(10) Patent No.: US 8,711,157 B2
(45) Date of Patent: Apr. 29, 2014

(54) SWITCHING DEVICE AND ELECTRONIC APPARATUS USING THE SAME

(75) Inventors: Yuan-Fa Huang, Shenzhen (CN);
Peng-Wei Gu, Shenzhen (CN);
Chang-Dong Xiang, Shenzhen (CN);
Wen-Juan Ning, Shenzhen (CN);
Yu-Zhe Geng, Shenzen (CN); Jia Chen, Shenzhen (CN); De-Ke Ma, Shenzhen (CN)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 275 days.

(21) Appl. No.: 13/109,042

(22) Filed: May 17, 2011

(65) Prior Publication Data
US 2011/0285628 A1    Nov. 24, 2011

(30) Foreign Application Priority Data
May 21, 2010   (CN) .......................... 2010 1 0179231

(51) Int. Cl.
*G06F 13/14*     (2006.01)

(52) U.S. Cl.
USPC ........................... 345/520; 345/163; 345/168

(58) Field of Classification Search
None
See application file for complete search history.

(56) References Cited

U.S. PATENT DOCUMENTS

| | | | |
|---|---|---|---|
| 7,759,823 B2 | 7/2010 | Kihara et al. | |
| 2001/0002828 A1* | 6/2001 | Nakamigawa | 345/87 |
| 2006/0230110 A1* | 10/2006 | VanHarlingen et al. | 709/205 |
| 2007/0022234 A1* | 1/2007 | Yang | 710/62 |
| 2010/0100652 A1* | 4/2010 | Lin et al. | 710/73 |
| 2011/0145451 A1* | 6/2011 | Soffer et al. | 710/64 |

* cited by examiner

*Primary Examiner* — Joseph Haley
*Assistant Examiner* — Ifedayo Iluyomade
(74) *Attorney, Agent, or Firm* — Novak Druce Connolly Bove + Quigg LLP

(57) ABSTRACT

A switching device includes a plurality of first interfaces respectively coupled to a plurality of computers, a third interface coupled to a display module, and a switching unit coupled to the first interfaces and the third interface. The switching unit is used for selecting one of the first interfaces to be coupled to the third interface in response to a command. The display module receives a video signal from a selected one of the computers through the selected first interface and the third interface, and displays video information.

18 Claims, 2 Drawing Sheets

SWITCHING DEVICE AND ELECTRONIC APPARATUS USING THE SAME

BACKGROUND

1. Technical Field

The disclosed embodiments relate to switching devices, and more particularly to a switching device and an electronic apparatus.

2. Description of Related Art

A kind of switching device includes a switching unit connected to a plurality of computers, and a plurality of display modules respectively corresponds to the computers. The switching unit is used for selecting one of the computers to be connected to the corresponding display module, so that the selected display module can receive a video signal from the selected computer and display information according to the video signal.

However, in order to acquire information from the plurality of computers, the plurality of display modules all must be observed, which is inconvenient for users.

What is needed, therefore, is a switching device and an electronic apparatus to overcome the above described limitations.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout two views.

DETAILED DESCRIPTION

Figure 1:
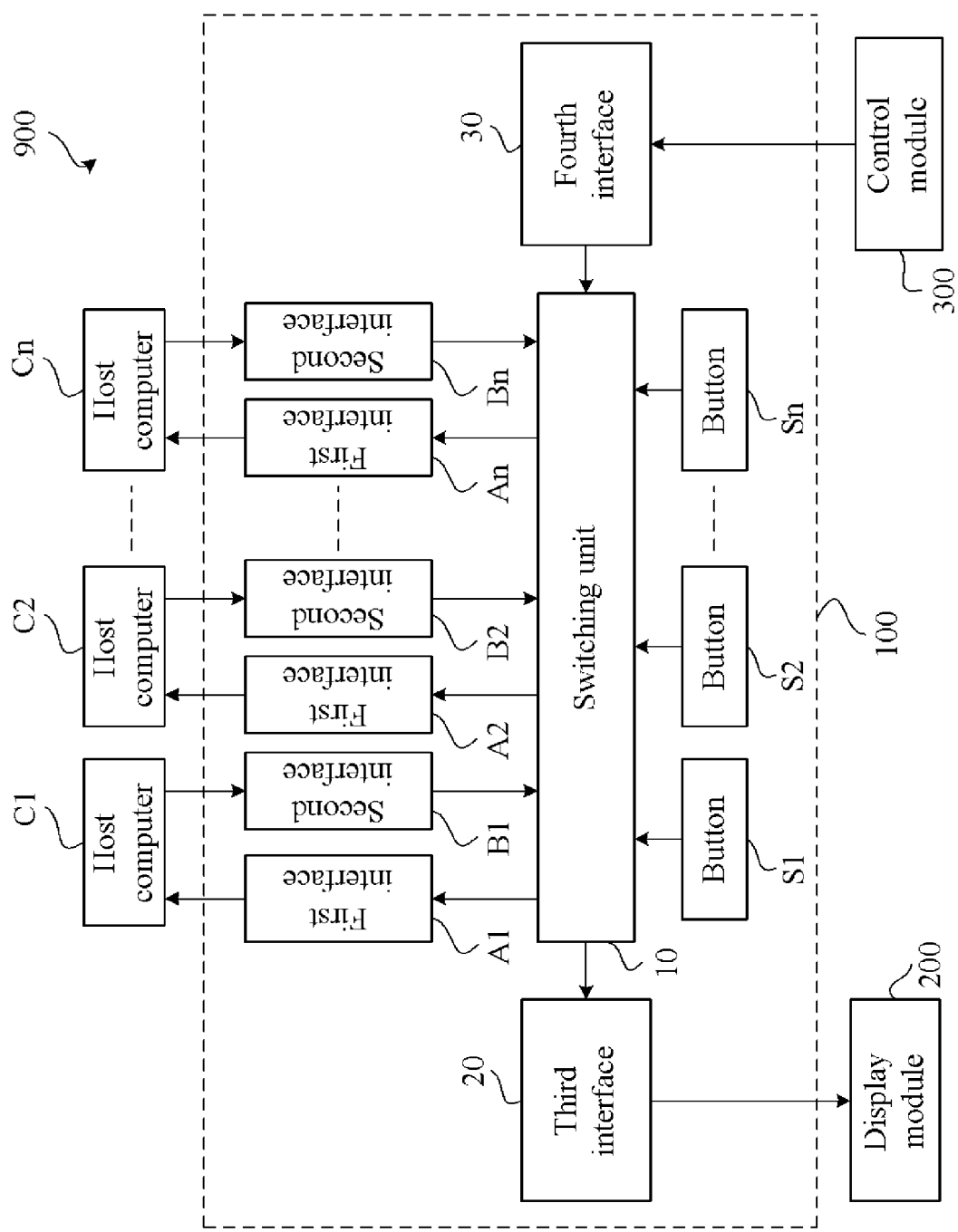
FIG. 1 is a block diagram of an electronic apparatus in accordance with one embodiment, the electronic apparatus includes a switching device.

Referring to FIG. 1, an electronic apparatus 900 includes a plurality of computers C1, C2, ..., Cn, a switching device 100, a display module 200, and a control module 300. The switching device 100 includes a plurality of first interfaces A1, A2, ..., An, a plurality of second interfaces B1, B2, ..., Bn, a plurality of buttons S1, S2, ..., Sn, a switching unit 10, a third interface 20, and a fourth interface 30.

The first interfaces A1, A2, ..., An are respectively coupled to the computers C1, C2, ..., Cn, and the second interfaces B1, B2, ..., Bn are also respectively coupled to the computers C1, C2, ..., Cn. The first interfaces A1, A2, ..., An, the second interfaces B1, B2, ..., Bn, the third interface 20, the fourth interface 30, and the buttons S1, S2, ..., Sn are coupled to the switching unit 10. The third interface 20 is further coupled to the display module 200, and the fourth interface 30 is further coupled to the control module 300. In this embodiment, the control module 300 can be a keyboard, a mouse, etc., the first interfaces A1, A2, ..., An and the third interface 20 are universal serial bus (USB) interfaces, the second interfaces B1, B2, ..., Bn and the fourth interface 30 are video graphics array (VGA) interfaces.

The buttons S1, S2, ..., Sn respectively correspond to the first interfaces A1, A2, ..., An, and respectively correspond to the second interfaces B1, B2, ..., Bn. When one of the buttons S1, S2, ..., Sn is pressed, a corresponding command is generated.

The switching unit 10 is used for selecting one of the first interfaces A1, A2, ..., An to be coupled to the third interface 20 and selecting one of the second interfaces B1, B2, ..., Bn to be coupled to the fourth interface 30 in response to the command. The selected first interface and the selected second interface are coupled to the same computer of one of the computers C1, C2, ..., Cn.

The display module 200 receives a video signal from the selected computer through the selected first interface and the third interface 20, and displays video information according to the video signal. The selected computer receives a control signal from the control module 300 through the selected second interface and the fourth interface 30, and performs corresponding functions according to the control signal.

For example, when the button S1 is pressed, the switching unit 10 selects the first interface A1 to be coupled to the third interface 20, and selects the second interface B1 to be coupled to the fourth interface 30. Therefore, the display module 200 receives the video signal from the computer C1 through the first interface A1 and the third interface 20, and displays video information. The computer C1 receives the control signal from the control module 300 through the second interface B1 and the fourth interface 30, and performs corresponding functions according to the control signal.

The switch device 100 can select any one of the computers C1, C2, ..., Cn to be coupled to the display module 200, thus the information of any one of the computers C1, C2, ..., Cn can be acquired by viewing the display module 200, which is convenient for users.

Figure 2:
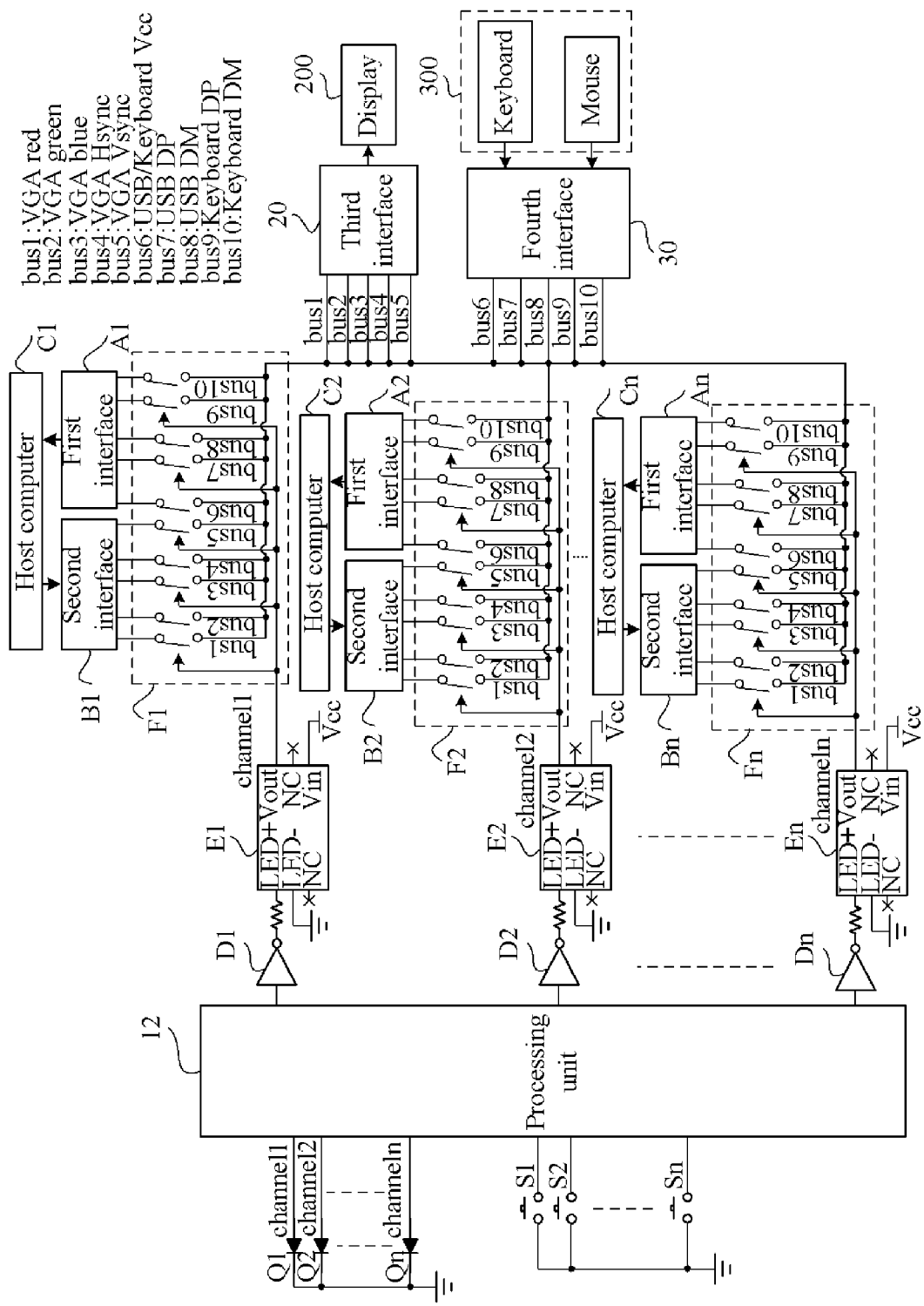
FIG. 2 is a circuit diagram of the switching device of FIG. 1 in accordance with one embodiment.

Referring to FIG. 2, the switching unit 10 includes a processing unit 12, a plurality of inverters D1, D2, ..., Dn, a plurality of first switches E1, E2, ..., En, and a plurality of second switches F1, F2, ..., Fn. The inverters D1, D2, ..., Dn are respectively coupled between a control terminal of the first switches E1, E2, ..., En and the processing unit 12. The first switches E1, E2, ..., En are respectively coupled between a control terminal of the second switches F1, F2, ..., Fn and a power source Vcc. The second switches F1, F2, ..., Fn are respectively coupled between the first interfaces A1, A2, ..., An and the third interface 20. The second switches F1, F2, ..., Fn are further respectively coupled between the second interfaces B1, B2, ..., Bn and the fourth interface 30. In this embodiment, the first switches E1, E2, ..., En and the second switches F1, F2, ..., Fn can be relays.

The switch device 100 further includes a plurality of light emitting diodes (LEDs) Q1, Q2, ..., Qn respectively corresponding to the buttons S1, S2, ..., Sn, an anode of the LEDs Q1, Q2, ..., Qn is respectively coupled to the control terminal of the second switches F1, F2, ..., Fn, and a cathode of each LED Q1, Q2, ..., Qn is grounded.

When one of the buttons S1, S2, ..., Sn is pressed, a corresponding command is generated. The processing unit 12 generates a selection signal according to the command, and a selected one of the inverters D1, D2, ..., Dn inverts the selection signal. The control terminal of a selected one of the first switches E1, E2, ..., En receives the inverted selection signal, then the selected first switch is turned on; thus the power source Vcc provides a supply voltage to the control terminal of a selected one of second switches F1, F2, ..., Fn, then the selected second switch is turned on, therefore a selected one of the first interfaces A1, A2, ..., An is coupled to the third interface 20, and a selected one of the second interfaces B1, B2, ..., Bn is coupled to the fourth interface 30.

Further, because the selected first switch is turned on, the corresponding one of the LEDs Q1, Q2, ..., Qn receives the supply voltage from the power source Vcc and emits light.

For example, when the button S1 is pressed, the processing unit 12 generates the selection signal, the inverter D1 inverts the selection signal, the first switch E1 is turned on according to the inverted selection signal, the second switch F1 receives the supply voltage from the power source Vcc and is turned on. Therefore, the first interface A1 is coupled to the third interface 20, and the second interface B1 is coupled to the fourth interface 30. At the same time, the power source Vcc provides the supply voltage to the LED Q1, and the LED Q1 emits light to indicate that the button S1 is pressed. Therefore, instead of having to have multiple display modules and observing each one to gain information, a user need only use one display module which is selectively connected to each of the computers.

Alternative embodiments will become apparent to those skilled in the art without departing from the spirit and scope of what is claimed. Accordingly, the present invention should be deemed not to be limited to the above detailed description, but rather only by the claims that follow and equivalents thereof.

What is claimed is:

1. A switching device, comprising:
a plurality of first interfaces respectively coupled directly to a plurality of computers;
a third interface directly coupled to a display module; and
a switching unit directly coupled to the first interfaces and the third interface;
wherein the switching unit is used for selecting one of the first interfaces to be coupled to the third interface in response to a command, the switching unit comprises a processing unit for receiving the command, a plurality of first switches corresponding to the first interfaces, and a plurality of second switches corresponding to the first interfaces, a control terminal of each first switches is coupled to the processing unit, the first switches are respectively coupled between a control terminal of the second switches and a power source for controlling the corresponding second switch; the second switches are respectively coupled between the first interfaces and the third interface for connecting the corresponding first interface and the third interface when being turned on; when received the command, the processor unit controls one of the first switches corresponding to the received command to turn on, the corresponding second switch turns on for connecting the corresponding first interface with the third interface in response to the turned on first switch, the rest of the first interfaces disconnect with the third interface, thereby the display module receives and displays the video signal from the computer coupled with the first interface connected with the third interface.

2. The switching device of claim 1, further comprising a plurality of second interfaces respectively coupled to the computers and a fourth interface coupled to a control module, wherein the switching unit is used for selecting one of the second interfaces to be coupled to the fourth interface in response to the command, the selected first interface and the selected second interface are coupled to the selected computer, the selected computer receives a control signal from the control module through the selected second interface and the fourth interface, and performs corresponding functions according to the control signal.

3. The switching device of claim 1, further comprising a plurality of buttons coupled to the switching unit, wherein when one of the buttons is pressed, the corresponding command is generated, the buttons respectively correspond to the first interfaces and respectively correspond to the second interfaces.

4. The switching device of claim 2, wherein the second switches are respectively coupled between the second interfaces and the fourth interface.

5. The switching device of claim 4, wherein the processing unit generates a selection signal to the control terminal of a selected one of the first switches according to the command, then the selected first switch is turned on; thus the power source provides a supply voltage to the control terminal of a selected one of the second switches, then the selected second switch is turned on, the selected first interface is coupled to the third interface, and the selected second interface is coupled to the fourth interface.

6. The switching device of claim 5, wherein the switching unit further comprises a plurality of inverters, the inverters are respectively coupled between the control terminal of the first switches and the processing unit, each inverters is used for inverting the control signal.

7. The switching device of claim 4, further comprises a plurality of light emitting diodes (LEDs) respectively corresponding to the buttons, an anode of the LEDs is respectively coupled to the control terminal of the second switches, a cathode of each LEDs is grounded, when one of the buttons is pressed, the corresponding one of the first switches is turned on, then the corresponding one of the LEDs receives the supply voltage from the power source and emits light.

8. The switching device of claim 2, wherein the first interfaces and the third interface are universal serial bus (USB) interface, the second interfaces and the fourth interface are video graphics array (VGA) interface.

9. The switching device of claim 2, wherein the control module is a keyboard or a mouse.

10. An electronic apparatus, comprising:
a plurality of computers;
a display module; and
a switching device; the switching device comprising:
a plurality of first interfaces respectively coupled directly to a plurality of computers;
a third interface directly coupled to a display module; and
a switching unit directly coupled to the first interfaces and the third interface;
wherein the switching unit is used for selecting one of the first interfaces to be coupled to the third interface in response to a command, the switching unit comprises a processing unit for receiving the command, a plurality of first switches corresponding to the first interfaces, and a plurality of second switches corresponding to the first interfaces, a control terminal of each first switches is coupled to the processing unit, the first switches are respectively coupled between a control terminal of the second switches and a power source for controlling the corresponding second switch; the second switches are respectively coupled between the first interfaces and the third interface for connecting the corresponding first interface and the third interface when being turned on when received the command, the processor unit controls one of the first switches corresponding to the received command to turn on, the corresponding second switch turns on for connecting the corresponding first interface with the third interface in response to the turned on first switch, the rest of the first interfaces disconnect with the third interface, thereby the display module receives and displays the video signal from the computer coupled with the first interface connected with the third interface.

11. The electronic apparatus of claim 10, further comprising a control module, wherein the switch device further comprises a plurality of second interfaces respectively coupled to the computers and a fourth interface coupled to the control module, the switching unit is used for selecting one of the second interfaces to be coupled to the fourth interface in response to the command, the selected first interface and the selected second interface are coupled to the selected computer, the selected computer receives a control signal from the control module through the selected second interface and the fourth interface, and performs corresponding functions according to the control signal.

12. The electronic apparatus of claim 10, wherein the switch device further comprises a plurality of buttons coupled to the switching unit, when one of the buttons is pressed, the corresponding command is generated, the buttons respectively correspond to the first interfaces and respectively correspond to the second interfaces.

13. The electronic apparatus of claim 11, wherein the second switches are respectively coupled between the second interfaces and the fourth interface.

14. The electronic apparatus of claim 13, wherein the processing unit generates a selection signal to the control terminal of a selected one of the first switches according to the command, then the selected first switch is turned on; thus the power source provides a supply voltage to the control terminal of a selected one of the second switches, then the selected second switch is turned on, the selected first interface is coupled to the third interface, and the selected second interface is coupled to the fourth interface.

15. The electronic apparatus of claim 14, wherein the switching unit further comprises a plurality of inverters, the inverters are respectively coupled between the control terminal of the first switches and the processing unit, each inverters is used for inverting the control signal.

16. The electronic apparatus of claim 14, wherein the switching device further comprises a plurality of light emitting diodes (LEDs) respectively corresponding to the buttons, an anode of the LEDs is respectively coupled to the control terminal of the second switches, a cathode of each LEDs is grounded, when one of the buttons is pressed, the corresponding one of the first switches is turned on, then the corresponding one of the LEDs receives the supply voltage from the power source and emits light.

17. The electronic apparatus of claim 11, wherein the first interfaces and the third interface are universal serial bus (USB) interface, the second interfaces and the fourth interface are video graphics array (VGA) interface.

18. The electronic apparatus of claim 11, wherein the control module is a keyboard or a mouse.

\* \* \* \* \*